(12) United States Patent
Uhari

(10) Patent No.: US 7,226,321 B2
(45) Date of Patent: Jun. 5, 2007

(54) INSTANT FASTENING SYSTEM, INSTANT SOCKET AND PORTABLE ELECTRONIC DEVICE

(75) Inventor: Ilkka Uhari, Oulu (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 11/336,632

(22) Filed: Jan. 20, 2006

(65) Prior Publication Data

US 2006/0189218 A1    Aug. 24, 2006

(30) Foreign Application Priority Data

Jan. 21, 2005    (FI) ............................... 20050022 U

(51) Int. Cl.
  *H01R 13/514*    (2006.01)
(52) U.S. Cl. ..................................... 439/752
(58) Field of Classification Search ................ 439/752, 439/314, 352–353, 258–259, 157, 368
  See application file for complete search history.

(56) References Cited

U.S. PATENT DOCUMENTS 5,570,984 A    11/1996    Reznikov et al.
5,623,731 A    4/1997    Ehrgott et al.
5,647,776 A *  7/1997    Duclos et al. ............... 439/752
6,811,422 B1 * 11/2004    Muller ........................ 439/314
2004/0038596 A1 * 2/2004  Bartholoma et al. ........ 439/752
2004/0171317 A1 * 9/2004  Finzer et al. ............... 439/752

FOREIGN PATENT DOCUMENTS

DE     10052453      5/2002
EP      1196005      4/2002

* cited by examiner

*Primary Examiner*—J. F. Duverne
(74) *Attorney, Agent, or Firm*—Hoffmann & Baron, LLP

(57) ABSTRACT

The invention relates to an instant fastening system for fastening a portable electronic device to an object, the instant fastening system comprising: an instant socket, which comprises at least one fastening element for fastening the instant socket to the object; a connecting structure for connecting the portable electronic device to the instant socket, the connecting structure comprising connecting elements that radially extend from the connecting structure, the instant socket further comprising a positioning housing for positioning the connecting structure to the instant socket, the circumference of the positioning housing comprising radial positioning grooves for locking the connecting elements when rotating the connecting structure in the positioning housing, from which positioning grooves at least two positioning grooves are located on the same side of the circumference of the positioning housing, thus allowing to position the connecting structure to the instant socket in at least two positions differing from the opposing positions.

15 Claims, 5 Drawing Sheets

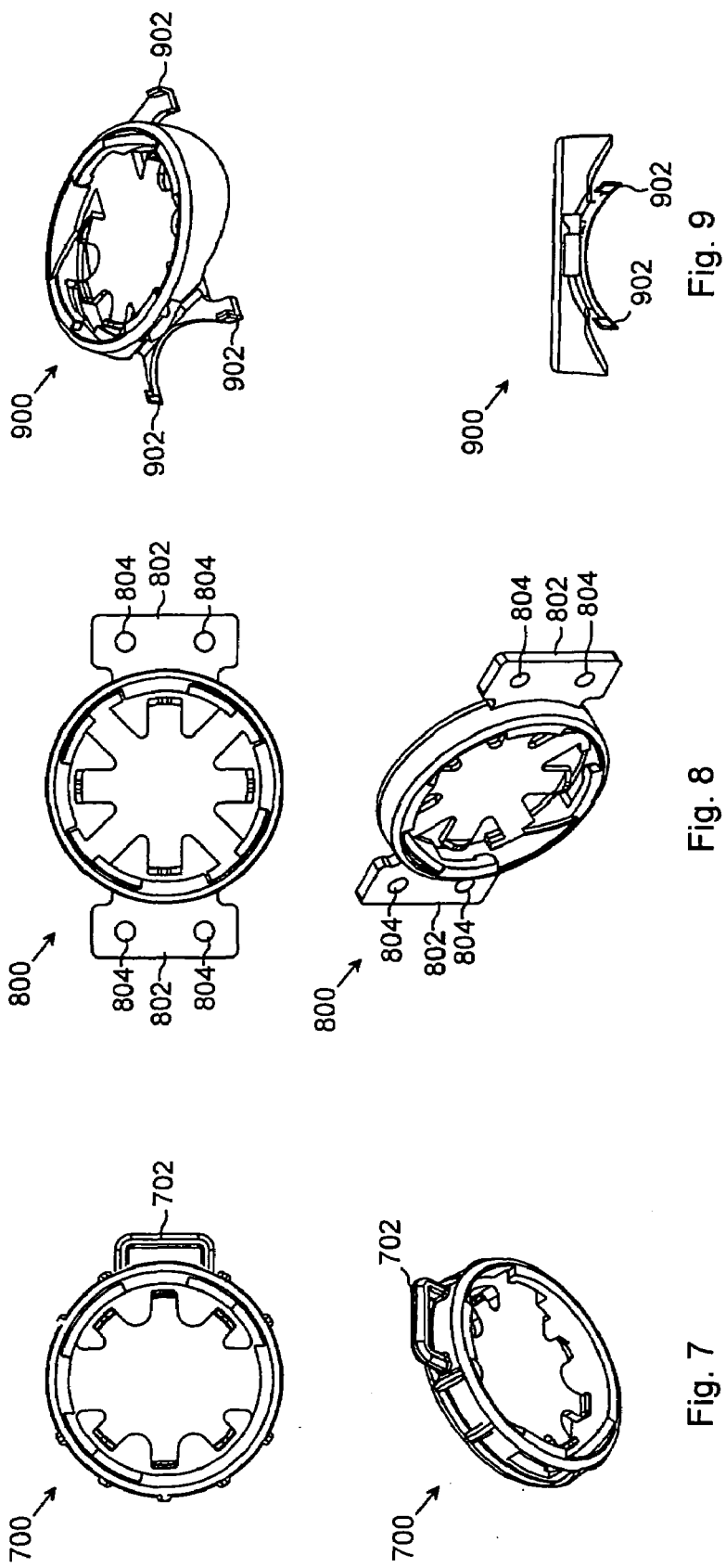

INSTANT FASTENING SYSTEM, INSTANT SOCKET AND PORTABLE ELECTRONIC DEVICE

CROSS-REFERENCE TO RELATED APPLICATION

This application claims priority based on Finnish Utility Model Application No. U20050022, filed on Jan. 21, 2005, which is incorporated herein by reference.

FIELD OF THE INVENTION

The invention relates to an instant fastening system for fastening a portable electronic device to an object, an instant socket for fastening a portable electronic device to an object and a portable electronic device.

BRIEF DESCRIPTION OF THE RELATED ART

The small size of electronic components makes it possible for the users to carry electronic devices with them. In certain circumstances the user must use a portable electronic device for instance by performing observations from the portable electronic device and/or by supplying commands to the electronic device while simultaneously carrying out an operation, such as exercising, which complicates the out taking of the electronic device. In such a case it is useful that the portable electronic device is fastened to an object, such as a bicycle, in which case the user may undisturbed or with very little disturbance continue to carry out the operation thereof.

In some cases where a portable electronic device is used it is necessary to be able to fasten the portable electronic device to the object by means of an instant fastening system.

In the prior art an instant fastening system typically comprises a socket part to be secured to the object, to which the portable electronic device is fastened. It is therefore useful to study the means that allow fastening the portable electronic device to an object such that the user may easily use the portable electronic device.

SUMMARY OF THE INVENTION

It is an object of the invention to provide a new type of instant fastening system, an instant socket and a portable electronic device, which considering the use of the portable electronic device enable to achieve an easy fastening of the portable electronic device to an object.

A first aspect of the invention shows an instant fastening system for fastening a portable electronic device to an object, the instant fastening system comprising an instant socket, which comprises at least one fastening element for fastening the instant socket to the object and a connecting structure for connecting the portable electronic device to the instant socket, wherein the connecting structure comprises connecting elements that radially extend from the connecting structure, and the instant socket comprises a positioning housing for positioning the connecting structure to the instant socket, and the circumference of the positioning housing comprises radial positioning grooves for locking the connecting elements when rotating the connecting structure in the positioning housing, from which positioning grooves at least two positioning grooves are located on the same side of the circumference of the positioning housing, thus allowing to position the connecting structure to the instant socket in at least two positions differing from the opposing positions.

A second aspect of the invention shows an instant socket for fastening a portable electronic device to an object, the instant socket comprising at least one fastening element for fastening the instant socket to the object, wherein the instant socket comprises a positioning housing for positioning a connecting structure to the instant socket, the connecting structure being connected to the portable electronic device and the connecting structure comprising connecting elements that radially extend from the connecting structure, and the circumference of the positioning housing comprises radial positioning grooves in which the connecting elements are locked when rotating the connecting structure in the positioning housing, from which positioning grooves at least two positioning grooves are located on the same side of the circumference of the positioning housing, thus allowing to position the connecting structure to the instant socket in at least two positions differing from the opposing positions.

A further aspect of the invention shows a portable electronic device comprising a connecting structure for connecting the electronic device to the instant socket, which may be fastened to an object, wherein the connecting structure comprises connecting elements that radially extend from the connecting structure, the connecting elements being placed and dimensioned to correspond with the at least two radial positioning grooves provided in the positioning housing, in which the connecting elements are locked when rotating the connecting structure in the positioning housing, from which positioning grooves at least two positioning grooves are located on the same side of the circumference of the positioning housing, thus allowing to position the connecting structure to the instant socket in at least two positions differing from the opposing positions.

Several advantages are achieved with the instant fastening system of the invention. As an example of one advantage the instant fastening system allows fastening a portable electronic device to an object in a favourable position regarding the use.

BRIEF DESCRIPTION OF THE DRAWINGS

In the following the invention will be described in greater detail with reference to the accompanying drawings, in which FIG. 7 shows an embodiment of an instant socket, FIG. 8 shows an embodiment of the instant socket, FIG. 9 shows an embodiment of the instant socket.

DETAILED DESCRIPTION OF THE PREFERRED EMBODIMENTS

Figure 1:
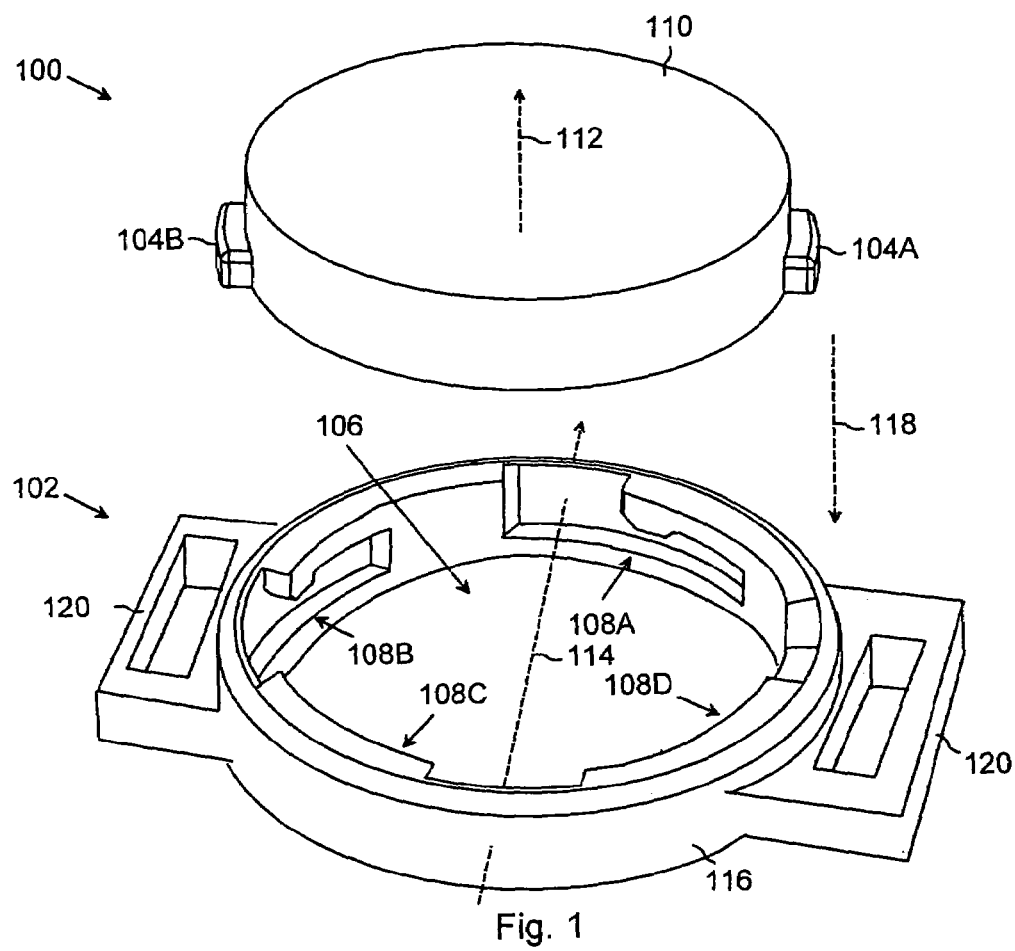
FIG. 1 shows a perspective view of an embodiment of an instant fastening system.

FIG. 1 shows an instant socket 102 and a connecting structure 100 of an instant fastening system.

The instant socket 102 comprises a fastening element 120 for fastening the instant socket 102 to an object.

FIG. 1 shows a position indicator 112 of the connecting structure 100 indicating the position of the connecting structure 100. The position indicator 112 of the connecting structure is fictitious and it is shown in FIG. 1 to facilitate the presentation of the embodiments of the invention. The position indicator 112 also represents the position of a portable electronic device in respect of the instant socket 102.

FIG. 1 further shows a position indicator 114 of the instant socket 102 indicating the position of the instant socket 102. The position indicator 114 of the instant socket 102 is fictitious and it is shown in FIG. 1 to facilitate the presentation of the embodiments of the invention.

The object is for instance a vehicle structure, an exercising equipment structure and/or a user's body part. The vehicle structure is for instance a control bar or another structure, to which the portable electronic device is preferably fastened. The exercising equipment is for instance a training device in a gym. The user's body part may for instance be the wrist and/or the chest.

The connecting structure 100 is an adaptor fastened to the portable electronic device and/or integrated into the portable electronic device, through which a connection between the portable electronic device and the instant socket 102 is established. The connecting structure 100 may comprise a flange plate 110 that forms the frame of the connecting structure 100. The frame of the connecting structure 100 may also be a part integrated into of the portable electronic device, such as a back plate.

The connecting structure 100 is made for instance of metal and/or plastic.

The connecting structure 100 comprises connecting elements 104A, 104B, which are radially extending from the connecting structure 100. The connecting elements 104A, 104B are typically projections radially projecting outwards from the connecting structure 100. The connecting elements 104A, 104B may form an integrated part with the flange plate 110 of the connecting structure 100 or they may be implemented as parts separate from the flange plate 110.

The portable electronic device is typically a device that the user caries with him/her, such as an audio device, an audiovisual device, a watch and/or a light source.

In an embodiment the portable electronic device is a performance monitor or a part of a performance monitor. A performance monitor typically measures the performance of a user, such as physical performance, for instance on the basis of measuring the user's heart rate or defining the user's physical movement. In an embodiment the portable electronic device is a heart rate monitor or a processing unit of a heart rate monitor, which comprises the user interface of the heart rate monitor. However, the solution shown is not restricted to the examples above, instead the portable electronic device may be any electronic device that is portable and that is to be fastened to the object by means of the instant fastening system according to the solution shown.

The instant socket 102 comprises a positioning housing 106 for positioning the connecting structure 100 to the instant socket 102. The positioning housing 106 is typically an opening formed in an instant socket frame 116 that typically positions the connecting structure 100 in relation to the instant socket 102 opposite to an installation direction 118 in the perpendicular direction preventing the lateral movement of the connecting structure 100 in respect of the instant socket 102. In the example shown in FIG. 1 a part of the positioning can be carried out by pressing the connecting structure 100 in the installation direction 118 into the positioning housing 106. Then the positioning housing 106 and the flange plate 110 of the connecting structure 100 are worth dimensioning in such a manner that the flange plate 110 is at least partly placed in the positioning housing 106.

The circumference of the positioning housing 106 comprises at least two positioning grooves 108A, 108B, 108C, 108D, in which the connecting elements 104A, 104B of the connecting structure 100 are locked when rotating the connecting structure 100 in the positioning housing 106.

In addition to the positioning grooves 108A to 108D the instant socket 102 may comprise other positioning structures, which form a support between the connecting structure 100 and the instant socket 102.

The positioning grooves 108A to 108D are typically recesses formed on the inner surface of the positioning housing 106 and on the frame of the instant socket 102. The recesses typically comprise a part in the installation direction 118 and another part substantially perpendicularly opposite to the installation direction 118. When rotating the connecting structure 100 in the positioning housing 106 in the rotation installation direction, then the connecting elements 104A, 104B are locked in the parts placed perpendicularly opposite to the installation direction 118. Correspondingly when rotating the connecting structure 100 against the rotation installation direction, then the connecting elements 104A, 14B are released from the positioning grooves 108A to 108D, and the portable electronic device can be released from the object.

Figure 2:
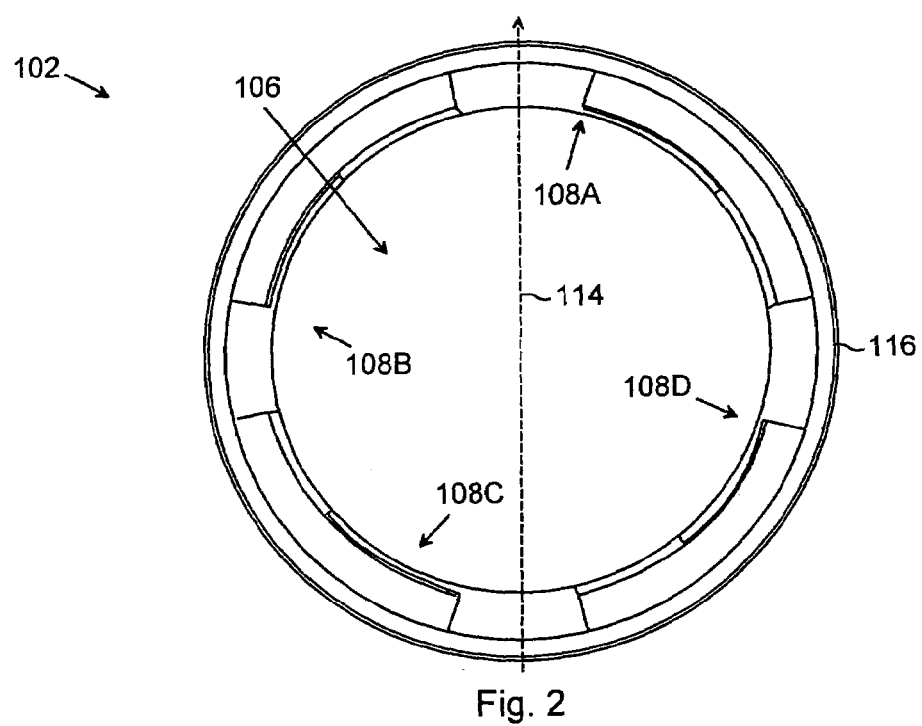
FIG. 2 shows a bottom view of an embodiment of the instant fastening system.

With reference to FIGS. 1 and 2 the positioning grooves 108A to 108D are placed such that at least two positioning grooves 108A to 108D are located on the same side of the circumference of the positioning housing 106. The connecting structure 100 can therefore be positioned in the instant socket 102 in at least two positions, which are not mutually opposite positions.

The location of the fastening elements 104A, 104B of the connecting structure 100 in the connecting structure 100, the number of fastening elements 104A, 104B and the location of the positioning grooves 108A to 108D in the instant socket 102 are typically selected in such a manner that the connecting structure 100 is positioned in the instant socket in at least two positions, which are not mutually opposite positions. In an embodiment the positioning grooves 108A to 108D are placed at even intervals on the circumference of the positioning housing 106. The intervals of the fastening elements 104A, 104B then equal the intervals of the positioning grooves 108A to 108D or are multiples of the intervals of the positioning grooves 108A to 108D. The fastening elements 104A, 104B are worth dimensioning such that the fastening elements 104A, 104B are firmly fitted into the positioning grooves 108A to 108D.

In an embodiment the circumference of the positioning housing 106 comprises several positioning groove pairs, the positioning grooves 108A to 108D of which are placed on opposite sides of the circumference of the positioning housing 106. Thus, each positioning groove pair opens the way for two positions between the connecting structure 100 and the instant socket 102, the positions being opposite to one another. In addition, N positioning groove pairs opens the way for 2N positions between the connecting structure 100 and the instant socket 102. In the embodiment shown the connecting structure 100 may comprise two fastening elements 104A, 104B on opposite sides of the connecting structure.

In an embodiment the instant socket comprises at least three positioning grooves 108A to 108D. Thus at least two positioning grooves 108A to 108D are placed on the same side of the circumference of the positioning housing 106. The connecting structure 100 may comprise three fastening elements 104A, 104B, the location of which in the connecting structure 100 corresponds to the location of the positioning grooves 108A to 108D on the circumference of the positioning housing 106.

When at least two positioning grooves 108A to 108D are located on the same side of the circumference of the positioning housing 106, then the angular distance of the positioning grooves 108A to 108D remains below 180 degrees. Consequently the connecting structure 100 can be positioned in the instant socket 102 in at least two differing positions that are not mutually opposite to one another. When studied, the sides of the circumference may be determined on the basis of the fictitious position indicator 114 of the instant socket 102. Then the position indicator 114 of the instant socket 102 is then a line segment, which proceeds substantially through the midpoint of the positioning housing 106.

Figure 3:
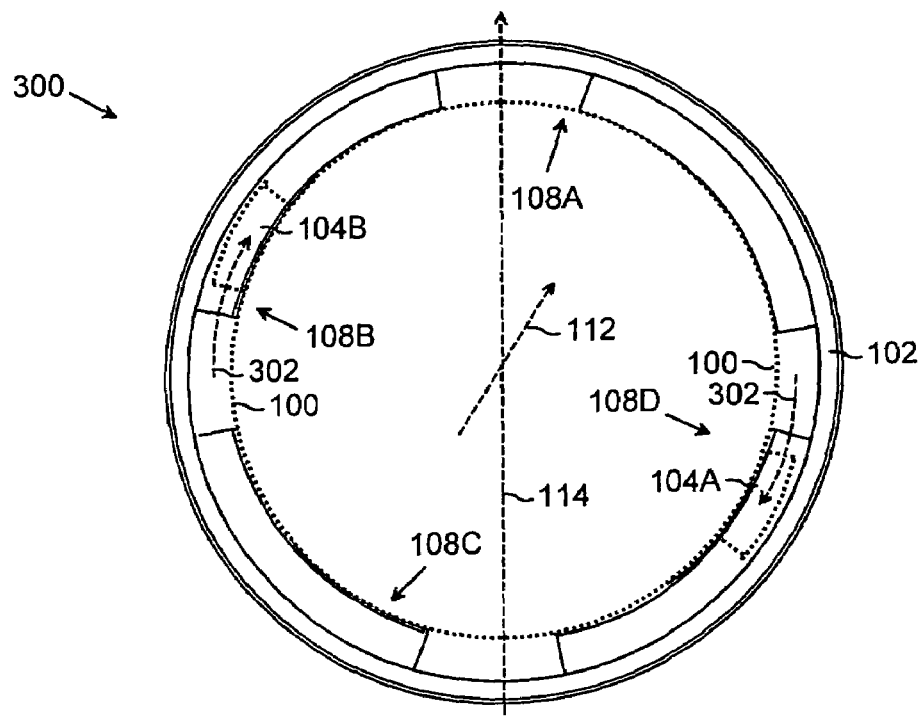
FIG. 3 shows a bottom view of an embodiment of the instant fastening system.
Figure 4:
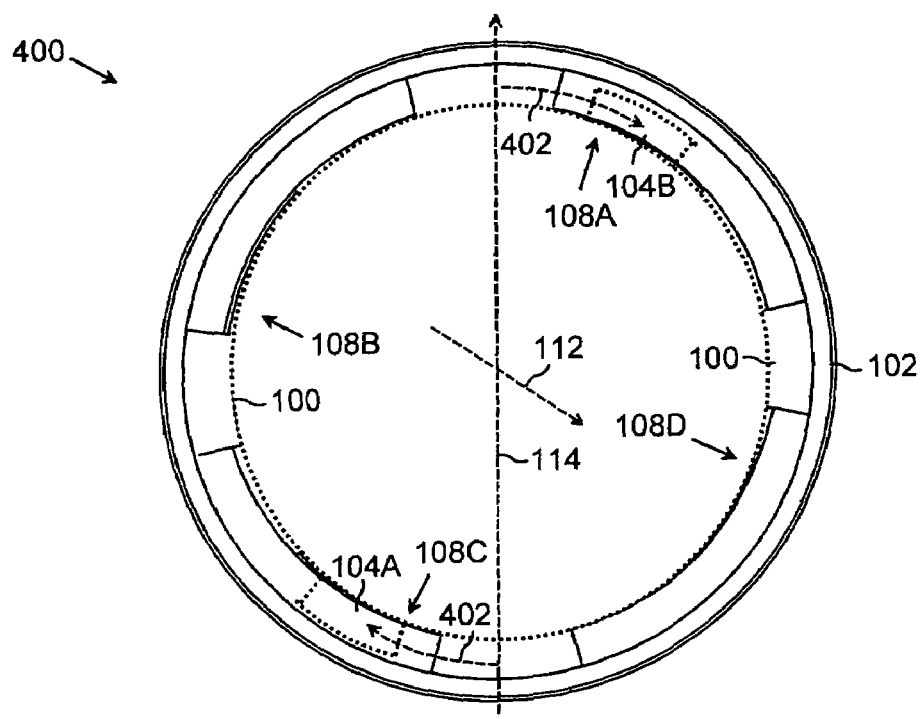
FIG. 4 shows a bottom view of an embodiment of the instant fastening system.

Let us take a closer look with reference to the examples shown in FIGS. 3 and 4 at the positions of the connecting structure 100 made possible by an instant fastening system 300, 400 in the instant socket 102. In FIGS. 3 and 4 a dotted line shows the fastening structure 100, and parts of the connecting structure 100 may partly be placed within the instant socket 102.

In FIG. 3 the connecting structure 100 is mounted in the instant socket 102 such that the connecting element 104B is positioned in the positioning groove 108B and the connecting element 104A is positioned in the positioning groove 108D. Thus, when rotating the connecting structure 100 in the instant socket 102 in a rotation installation direction 302, then the final position shown in FIG. 3 is achieved.

In FIG. 4 the connecting structure 100 is mounted in the instant socket 102 such that the connecting element 104B is positioned in the positioning groove 108A and the connecting element 104A is positioned in the positioning groove 108C. Thus, when rotating the connecting structure 100 in the instant socket 102 in a rotation installation direction 402, then the final position shown in FIG. 4 is achieved. Then the direction of the position indicator 112 of the connecting structure 100 is different in FIG. 4 but not an opposite one in respect of the direction of the position indicator 112 in FIG. 3. The example in FIG. 4 shows that the solution presented allows the portable electronic device to be fastened to an object in such a manner that the position of the portable electronic device can be selected among several alternatives.

Figure 5:
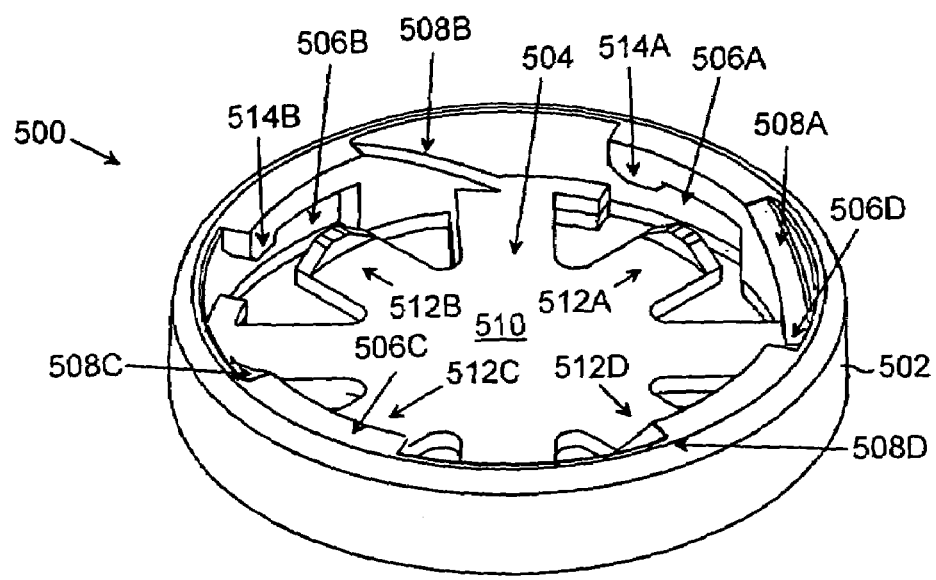
FIG. 5 shows a bottom view of an embodiment of the instant fastening system.
Figure 6:
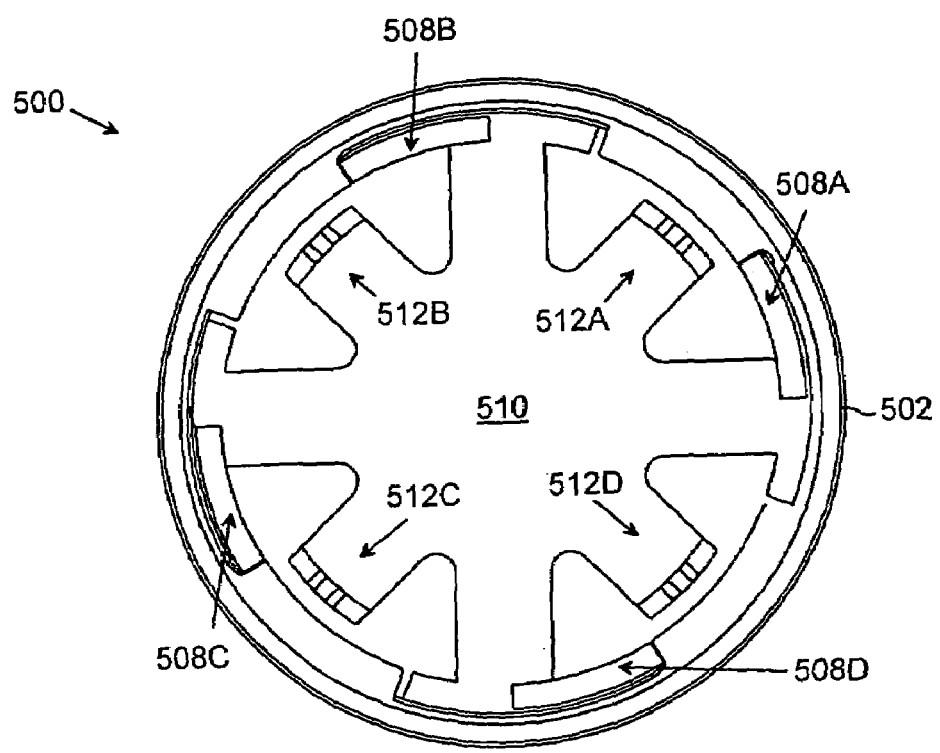
FIG. 6 shows a bottom view of an embodiment of the instant fastening system.

With reference to FIGS. 5 and 6, in an embodiment the instant socket 500 comprises a spring structure 512A, 512B, 512C, 512D supported from one end thereof at the bottom of a positioning housing 504, and the spring structure 512A to 512D directs a spring force adverse to the installation direction 118 to the connecting structure 100. In addition, each of the at least two positioning grooves 108A to 108D comprises a locking element 514A, 514B for locking the connecting element 104A, 104B by means of the spring force when the connecting structure 100 is rotated in the positioning housing 504.

The spring structure 512A to 512D may comprise from the middle of the positioning housing 504 spring rods supported from one end and extending in the direction of the circumference of the positioning housing 504, the ends of the spring rods supporting the connecting structure 100 rotated in the positioning housing 504 so that the connecting elements 104A, 104B of the connecting structure 100 are placed behind the locking elements 514A, 514B. The shape of the free ends of the spring rods may have an effect on the tightness of the installation of the connecting structure 100. The locking elements 514A, 514B can be structures formed in the positioning grooves 506A, 506B, 506C, 506D, such as embeddings and protrusions, which restrict the movement of the connecting elements 104A, 104B and thus the connecting structure 100 in the opposite direction of the rotation installation direction 302, 402.

The spring structure 512A to 512D may be supported with a plate structure 510 to a frame 502 of an instant socket 500, in which the plate structure 510 comprises fastening projections in order to fasten the plate structure 510 to the frame 502 of the instant socket 500. Then the spring rods may be integrated as a part of the plate structure 510.

The spring structure 512A to 512D according to the present solution placed at the bottom of the positioning housing 504 and supported at one end thereof opens the way for a flexible supporting structure provided with a thickness of a few millimetres that makes a firm connection between the connecting structure 100 and the instant socket possible so that the connecting structure 100 can, however, using an insignificant amount of force be mounted in the instant socket 500 and removed from the instant socket 500. The minor thickness of the supporting structure does not considerably or at all increase the total thickness of the instant socket 500, which allows using several instant socket 500 objects. Consequently the instant socket 500 can for instance be integrated as a part of the structure.

In an embodiment the positioning grooves 506A to 506D comprise positioning ramps 508A, 508B, 508C, 508D along which the connecting structure 100 ascends and descends when rotating the connecting structure 100 in the positioning housing 504. At the same time the positioning ramps 508A, 508B, 508C, 508D cause the connecting structure 100 to rotate in the rotation installation direction 302, 402 when pressing the connecting structure 100 to the instant socket in the installation direction 118.

Let us take a closer look at the embodiments of a fastening structure 120 with reference to FIGS. 7, 8 and 9.

FIG. 7 shows an example of a fastening loop 702, which may be used to fasten an instant socket 700 to a strap.

FIG. 8 shows an example of a level fastener 802, which may be used to fasten an instant socket 800 to a planar object. The level fastener 802 may comprise a fastening structure 804, by which the level fastener 802 can be fastened to the planar object.

FIG. 9 shows an example of a tubular section fastener 902, which may be used to fasten an instant socket 900 to a tubular object. The tubular object may for instance be a bicycle structure and/or a structure of an exercise machine. The tubular section fastener 902 can be connected to a tubular object for instance using a cable tie or similar fastening means.

Figure 10:
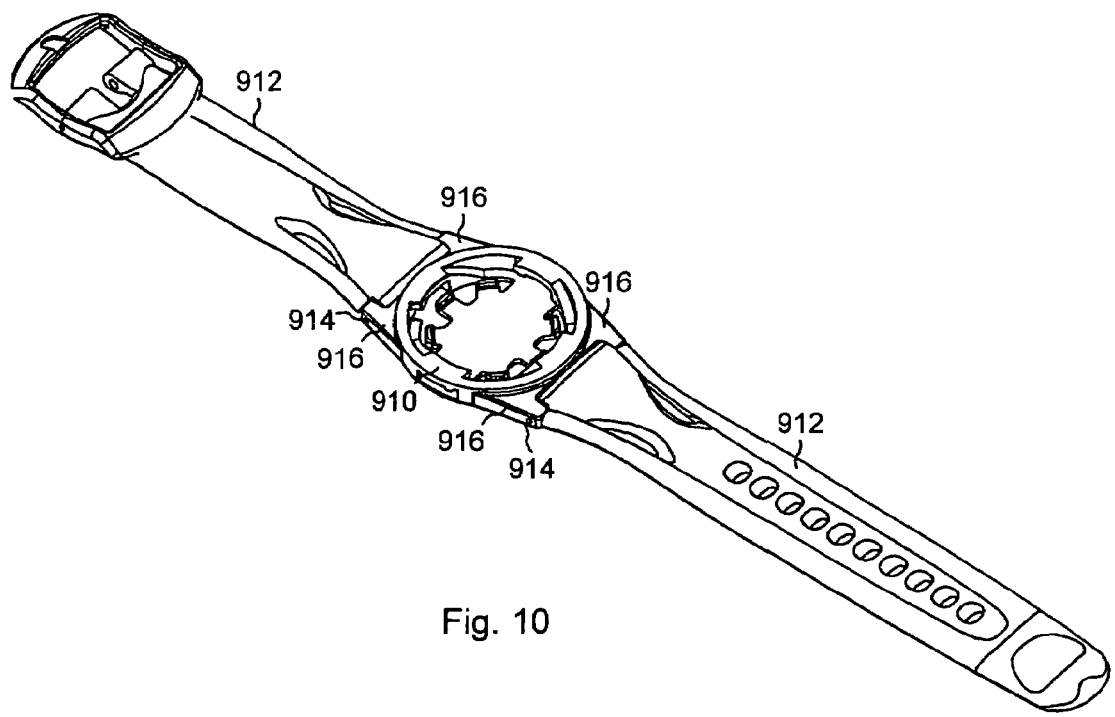
FIG. 10 shows an embodiment of the instant socket.

FIG. 10 shows an example of a wristband 912, which may be used to fasten an instant socket 910 to the user's wrist. The wristband 912 may be integrated as a part of the instant socket 910, in which case the wristband instant socket combination is made of the same part. In an embodiment the instant socket 910 comprises wristband fastening means 916, by which the instant socket 910 is fastened to the wristband 912 for instance using a pin 914.

Figure 11:
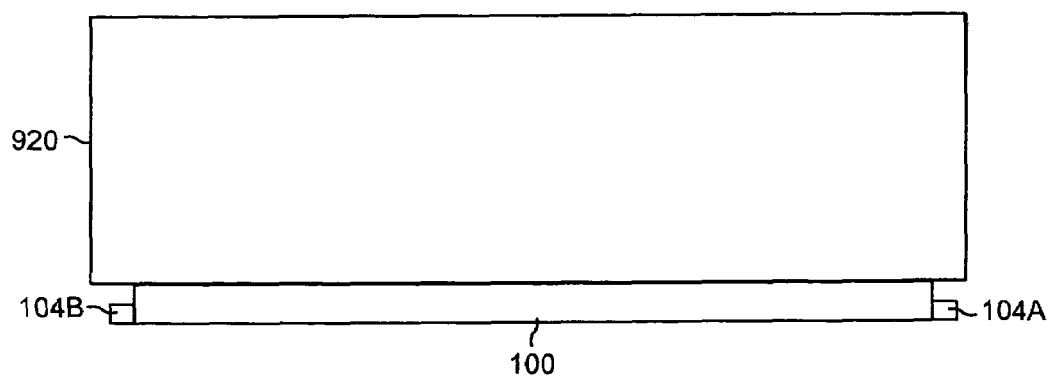
FIG. 11 shows an embodiment of a portable electronic device.

Let us take a closer look with reference to FIG. 11 at an example of an embodiment of the portable electronic device. In the example shown in FIG. 11 the connecting structure 100 is connected to the bottom of the portable electronic device 920.

In an embodiment the instant socket 102, 500, 700, 800, 900, 920 is for instance made of plastic using a compression moulding method, thus allowing the mass production of the instant socket 102, 500, 700, 800, 900, 920 at reduced production costs. When using the compression moulding technique both the frame 102, 502 and the spring structure 512A to 512D of the instant socket 500 are made of the same part.

Even though the invention is described above with reference to the examples according to the accompanying drawings, it is apparent that the invention is not restricted thereto but can be modified in various ways within the scope of the inventive idea presented in the accompanying claims.

The invention claimed is:

1. An instant fastening system adapted to fasten a portable electronic device to an object, the instant fastening system comprising:
   an instant socket, which comprises at least one fastening element for fastening the instant socket to the object; and
   a connecting structure adapted to connect the portable electronic device to the instant socket, the connecting structure comprising connecting elements that radially extend from the connecting structure, the instant socket further comprising a positioning housing adapted to position the connecting structure to the instant socket, the circumference of the positioning housing comprising radial positioning grooves adapted to lock the connecting elements when rotating the connecting structure in the positioning housing, from which positioning grooves at least two positioning grooves are located on the same side of the circumference of the positioning housing, thus allowing to position the connecting structure to the instant socket in at least two positions differing from the opposing positions; and
   a spring structure supported at one end of the bottom of the positioning housing, the spring structure directing a spring force adverse to the positioning direction on the connecting structure.

2. An instant fastening system as claimed in claim 1, wherein the circumference of the positioning housing comprises several positioning groove pairs, the positioning grooves of which are placed on the opposite sides of the circumference of the positioning housing.

3. An instant fastening system as claimed in claim 1, wherein the fastening element comprises at least one of the following: tubular section fasteners adapted to fasten an instant socket to a tubular object, a fastening loop adapted to fasten an instant socket to a strap, level fasteners adapted to fasten an instant socket to a planar object, a wristband adapted to fasten an instant socket to a user's wrist, wristband fastening means adapted to fasten the instant socket to the wristband.

4. An instant fastening system as claimed in claim 1, wherein the instant socket is made by means of compression moulding technique.

5. An instant fastening system as claimed in claim 1, wherein each one of the at least two positioning grooves comprises a locking element adapted to lock the connecting element by means of the spring force when the connecting structure is rotated in the positioning housing.

6. An instant fastening system as claimed in claim 1, wherein the spring structure comprises spring rods comprising free ends.

7. An instant fastening system as claimed in claim 6, wherein the spring rods are integrated into a plate structure of the instant socket.

8. An instant socket adapted to fasten a portable electronic device to an object, comprising:
   at least one fastening element adapted to fasten the instant socket to the object;
   a positioning housing adapted to position a connecting structure to the instant socket, the connecting structure being connected to the portable electronic device, the connecting structure comprising connecting elements that radially extend from the connecting structure, the circumference of the positioning housing comprising radial positioning grooves in which the connecting elements are locked when rotating the connecting structure in the positioning housing, from which positioning grooves at least two positioning grooves are located on the same side of the circumference of the positioning housing, thus allowing to position the connecting structure to the instant socket in at least two positions differing from the opposing positions; and
   a spring structure supported at one end at the bottom of the positioning housing, the spring structure directing a spring force adverse to the positioning direction on the connecting structure.

9. An instant socket as claimed in claim 8, wherein the circumference of the positioning housing comprises several positioning groove pairs, the positioning grooves of which are placed on the opposite sides of the circumference of the positioning housing.

10. An instant socket as claimed in claim 8, wherein the fastening element comprises at least one of the following: tubular section fasteners adapted to fasten an instant socket to a tubular object, a fastening loop adapted to fasten an instant socket to a strap, level fasteners adapted to fasten an instant socket to a planar object, a wristband adapted to fasten an instant socket to a user's wrist, wristband fastening means adapted to fasten the instant socket to the wristband.

11. An instant socket as claimed in claim 8, wherein the instant socket is made by means of compression moulding technique.

12. An instant socket as claimed in claim 8, wherein each one of the at least two positioning grooves comprises a locking element adapted to lock the connecting element by means of the spring force when the connecting structure is rotated in the positioning housing.

13. An instant socket as claimed in claim 8, wherein the spring structure comprises spring rods comprising free ends.

14. An instant socket as claimed in claim 13, wherein the spring rods are integrated into a plate structure of the instant socket.

15. A portable electronic device comprising:
   a connecting structure adapted to connect the electronic device to an instant socket, which is adapted to be fastened to an object, the connecting structure comprising connecting elements that radially extend from the connecting structure, the connecting elements being placed and dimensioned to correspond with the at least two radial positioning grooves provided in the positioning housing, in which the connecting elements are locked when rotating the connecting structure in the positioning housing, from which positioning grooves at least two positioning grooves are located on the same side of the circumference of the positioning housing, thus allowing to position the connecting structure to the instant socket in at least two positions differing from the opposing positions, wherein the connecting structure is adapted to receive a spring force from a spring structure supported at one end at the bottom of the positioning housing, wherein the spring force is directed adverse to the positioning direction on the connecting structure.

* * * * *